US008247729B2

(12) United States Patent  (10) Patent No.: US 8,247,729 B2
Bichsel  (45) Date of Patent: Aug. 21, 2012

(54) ELECTRICAL DISCHARGE POCKETING USING LOOP TYPE MACHINING ELECTRODE

(75) Inventor: Steven L. Bichsel, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1127 days.

(21) Appl. No.: 12/124,815

(22) Filed: May 21, 2008

(65) Prior Publication Data

US 2009/0230093 A1  Sep. 17, 2009

Related U.S. Application Data

(60) Provisional application No. 61/037,097, filed on Mar. 17, 2008.

(51) Int. Cl.
*B23H 1/00* (2006.01)
(52) U.S. Cl. .................. 219/69.17; 219/69.15; 219/69.2
(58) Field of Classification Search ............... 219/69.15, 219/69.17, 69.12
See application file for complete search history.

(56) References Cited

U.S. PATENT DOCUMENTS

| 2,974,216 | A | * | 3/1961 | Inoue | 219/69.12 |
|---|---|---|---|---|---|
| 3,366,771 | A | | 1/1968 | Jackson et al. | |
| 4,301,349 | A | * | 11/1981 | Inoue | 219/69.12 |
| 4,307,279 | A | * | 12/1981 | Inoue et al. | 219/69.12 |
| 4,386,248 | A | * | 5/1983 | Inoue | 219/69.12 |
| 4,743,729 | A | * | 5/1988 | Beal | 219/69.12 |
| 5,847,350 | A | | 12/1998 | Dorrel et al. | |
| 6,737,602 | B2 | | 5/2004 | Stelter | |

FOREIGN PATENT DOCUMENTS

| JP | 60-207722 A | * | 10/1985 |
|---|---|---|---|
| JP | 61-270029 A | * | 11/1986 |
| JP | 5-177444 A | * | 7/1993 |
| JP | 7-159295 A | * | 6/1995 |
| JP | 9-155646 A | * | 6/1997 |
| JP | 9-207030 A | * | 8/1997 |
| JP | 2003-136342 A | * | 5/2003 |

OTHER PUBLICATIONS

Machine translation of Japan Patent No. 9-155,646, Jul. 2011.*
Machine translation of Japan Patent No. 2003-136,342, Jul. 2011.*
Machine translation of Japan Patent No. 5-177,444, Jul. 2011.*

* cited by examiner

*Primary Examiner* — Geoffrey S Evans
(74) *Attorney, Agent, or Firm* — Bracewell & Giuliani LLP

(57) ABSTRACT

An electrode for EDM.

17 Claims, 17 Drawing Sheets

ELECTRICAL DISCHARGE POCKETING USING LOOP TYPE MACHINING ELECTRODE

CROSS REFERENCE TO RELATED APPLICATIONS

This application claims the benefit of the filing date of U.S. provisional patent application Ser. No. 61/037,097, filed on Mar. 17, 2008, the disclosure of which is incorporated herein by reference.

STATEMENT OF GOVERNMENT INTEREST

This invention was made under U.S. Government Contract N00019-02-C-3002. The Government has certain rights in the invention.

BACKGROUND

This disclosure relates to electrical discharge machining ("EDM").

BRIEF DESCRIPTION OF THE DRAWINGS

FIG. 5b is a cross sectional illustration of the EDM electrode of FIG. 5a.

FIG. 5c is an end view of the EDM electrode of FIG. 5a.

DETAILED DESCRIPTION

Figure 1:
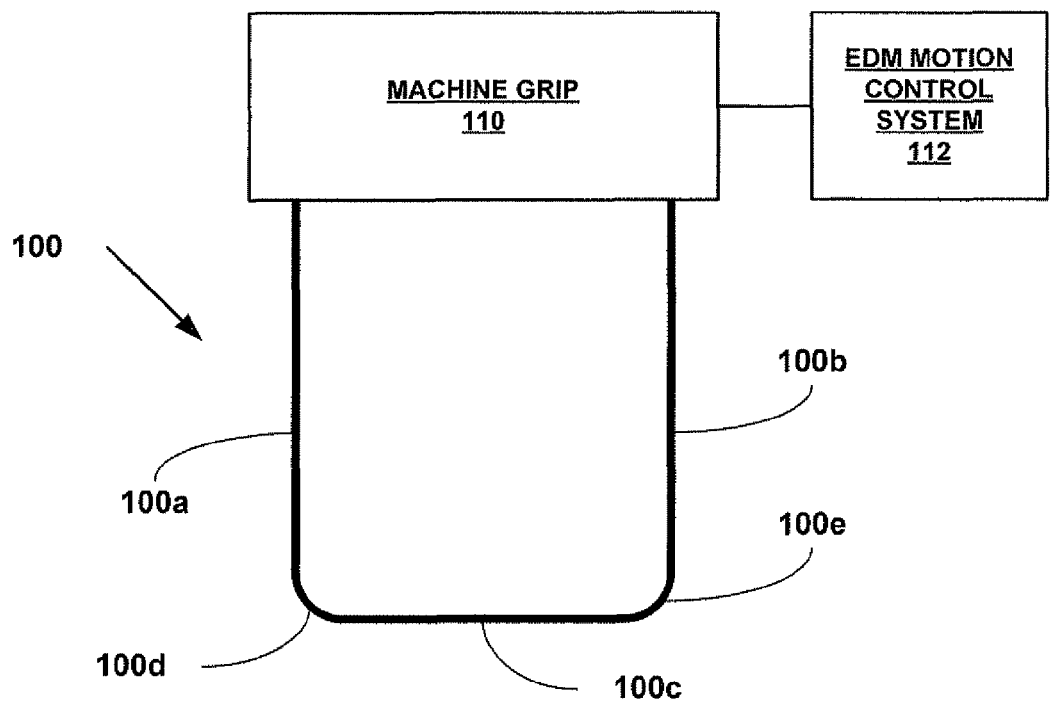
FIG. 1 is an illustration of an exemplary embodiment of an EDM electrode.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring initially to FIG. 1, an exemplary embodiment of an electrode 100 for EDM machining includes a pair of spaced apart vertical portions, 100a and 100b, and a horizontal portion 100c extending between ends of the vertical portions. In an exemplary embodiment, connection between the ends of the vertical portions, 100a and 100b, and the horizontal portion 100c include radiused intermediate portions, 100d and 100e. In an exemplary embodiment, the electrode 100 has a U-shaped profile. Other profiles may also be provided for the electrode 100, depending upon the desired volumetric shape of the cavity to be machined from a workpiece such as, for example, V-shaped, W-shaped, O-shaped, etc. . . .

The other ends of the electrode 100 are connected to conventional machine grips 110 and a conventional EDM machining motion control system 112. The general operation of EDM electrodes to machine material from a workpiece is considered well known to persons having ordinary skill in the art.

Referring to FIGS. 2a-2f, an exemplary embodiment of a method of operating the electrode 100 to machine a workpiece 200 will now be described.

Figure 2A:
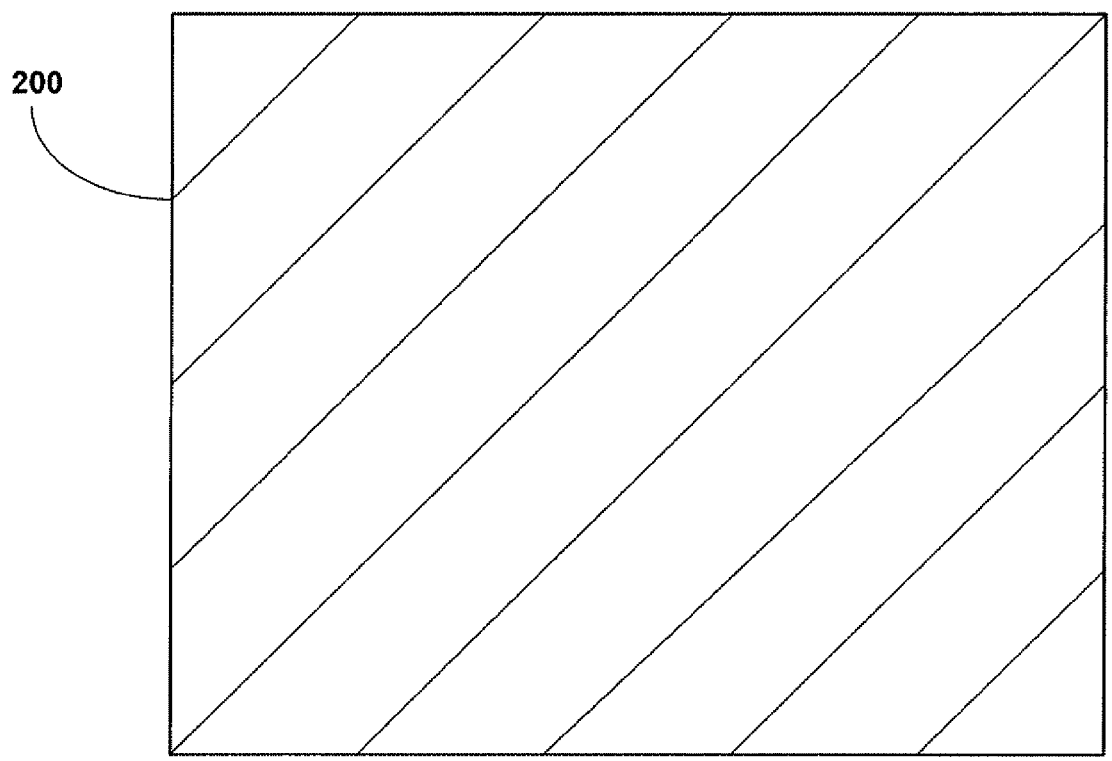
FIG. 2a is a cross sectional illustration of a workpiece.

As illustrated in FIG. 2a, a workpiece 200 is provided that is electrically conductive in composition.

Figure 2B:
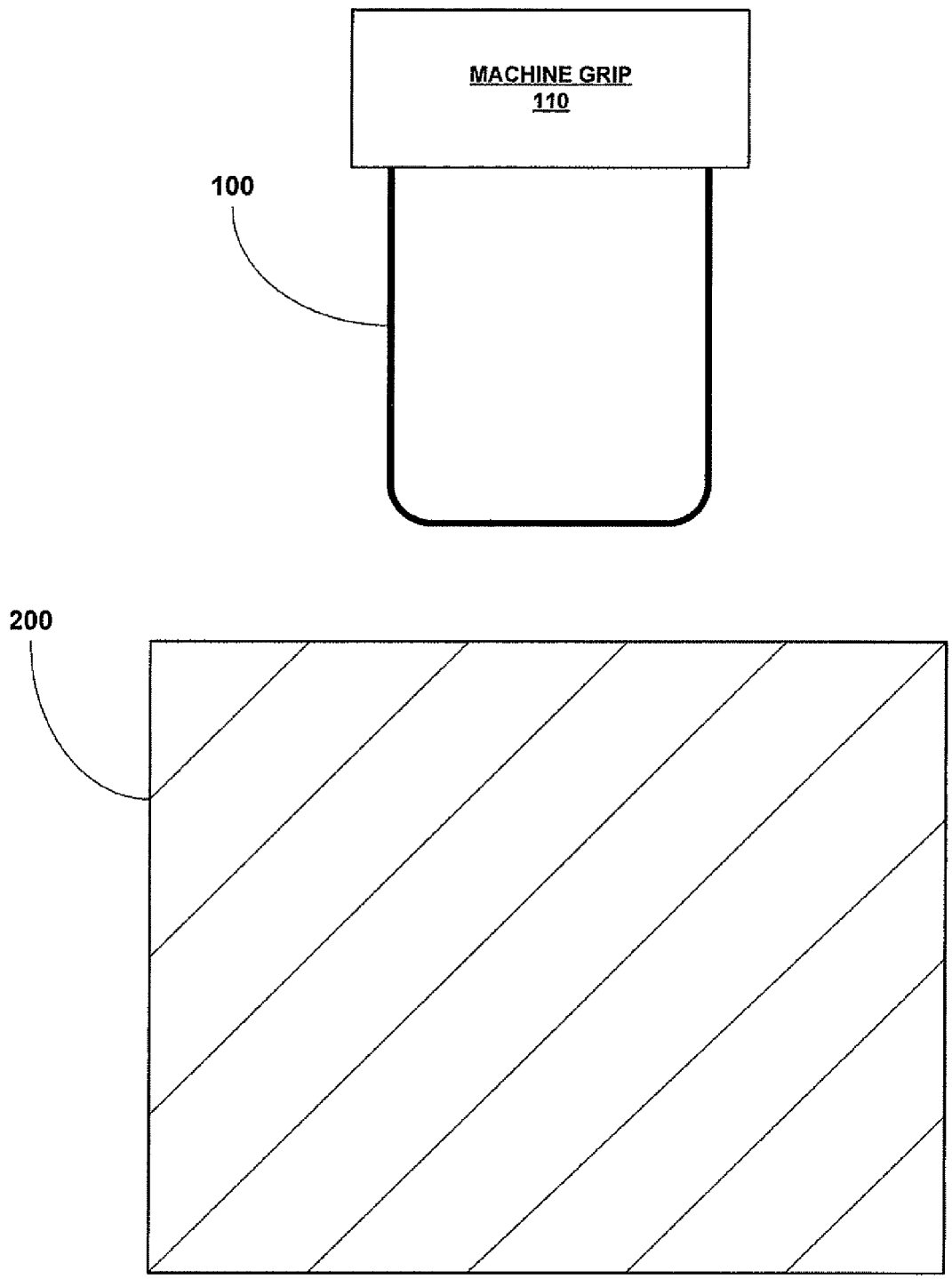
FIG. 2b is a cross sectional illustration of the workpiece of FIG. 2 during the machining of the workpiece using the EDM electrode of FIG. 1.

As illustrated in FIG. 2b, the electrode 100 is then positioned proximate the workpiece 200 using the grip 110.

Figure 2C:
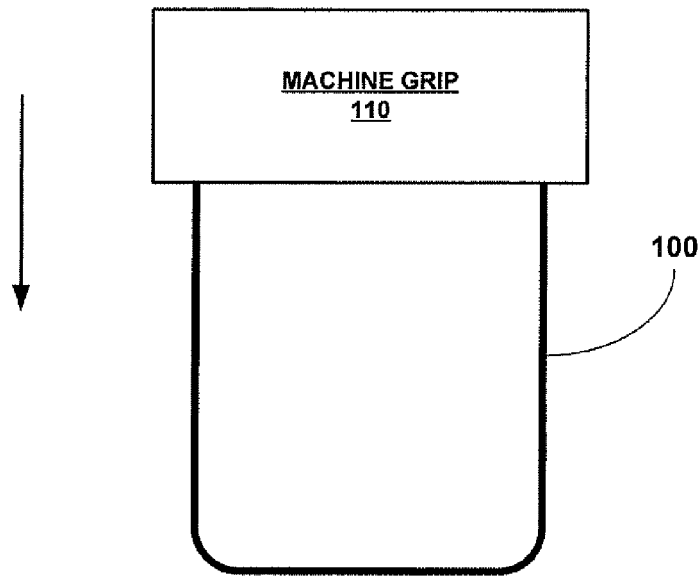
FIG. 2c is a cross sectional illustration of the workpiece of FIG. 2b during the continued machining of the workpiece using the EDM electrode.
Figure 2C:
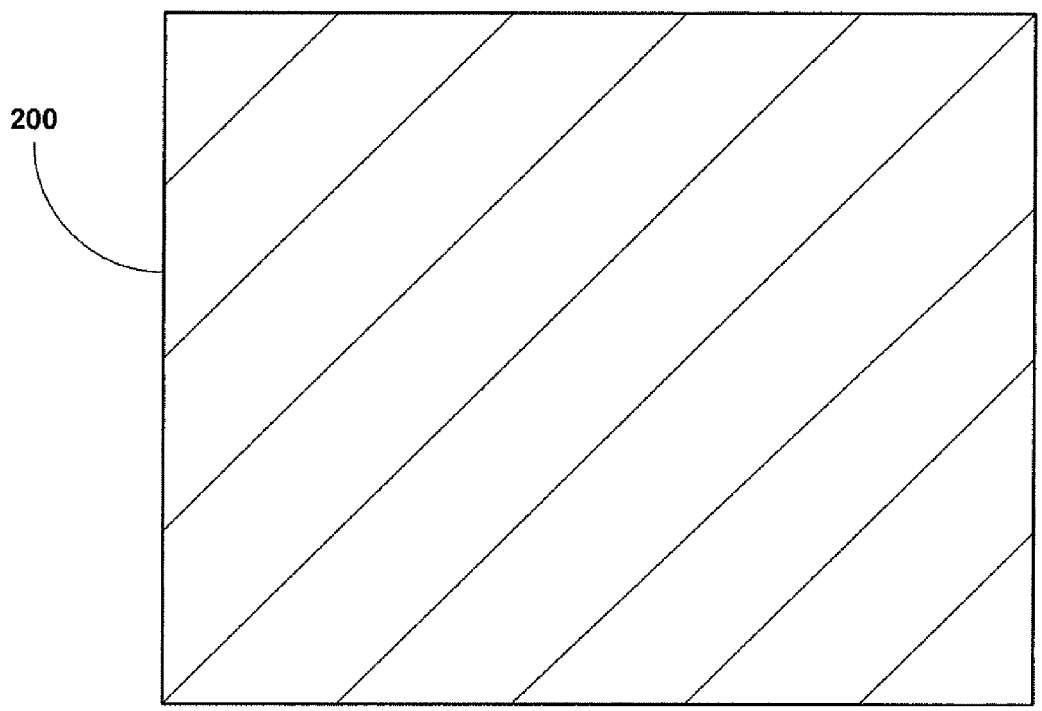

As illustrated in FIG. 2c, the electrode 100 is then displaced towards an outer surface of the workpiece 200 using the grip 110. Continued movement of the electrode 100 will bring the electrode into contact with the workpiece 200. As a result, during operation of the electrode 100, under the control of the EDM motion control system 112, the electrode will machine material from the workpiece.

Figure 2D:
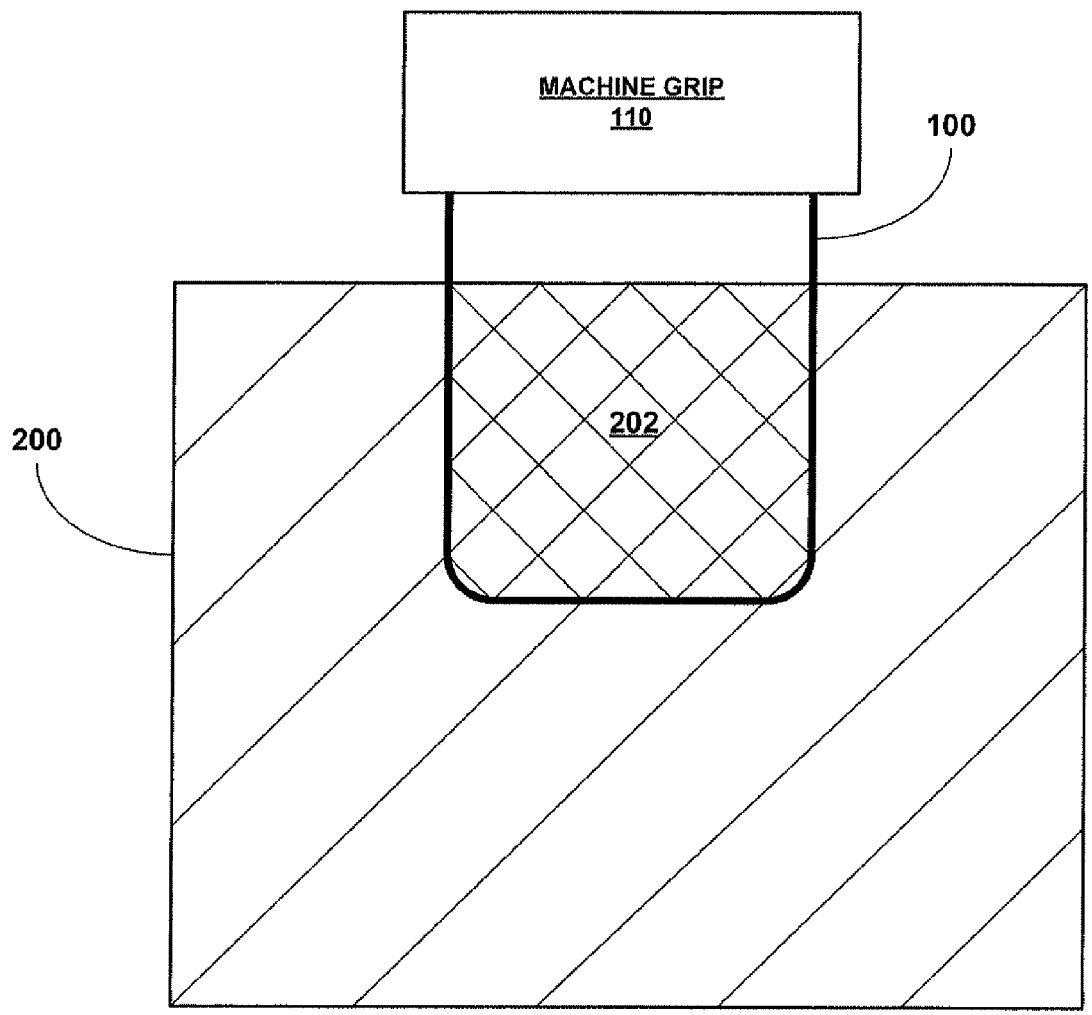
FIG. 2d is a cross sectional illustration of the workpiece of FIG. 2c during the continued machining of the workpiece using the EDM electrode.

As illustrated in FIG. 2d, the electrode 100 is then displaced further into the workpiece 200 using the grip 110 until a final desired depth of penetration is reached. As a result of the continued operation of the electrode 100, under the control of the EDM motion control system 112, the electrode will machine material from the workpiece in a region 202.

Figure 2E:
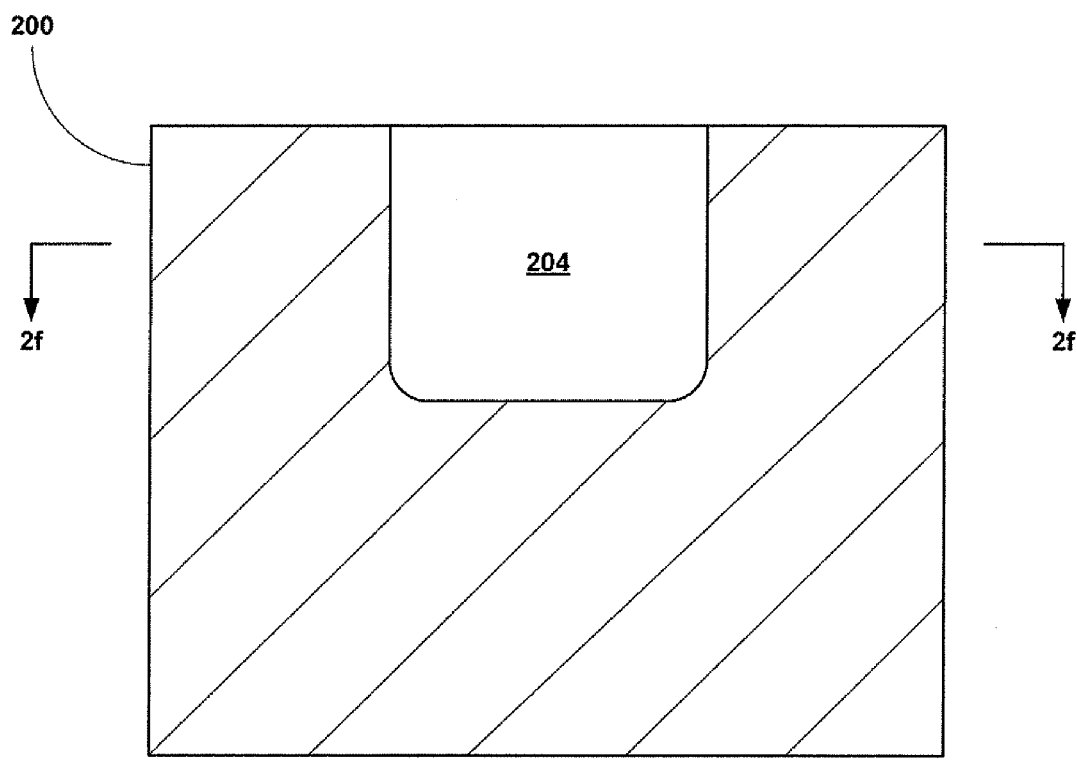
FIG. 2e is a cross sectional illustration of the workpiece of FIG. 2d after the completion of machining of the workpiece using the EDM electrode.
Figure 2F:
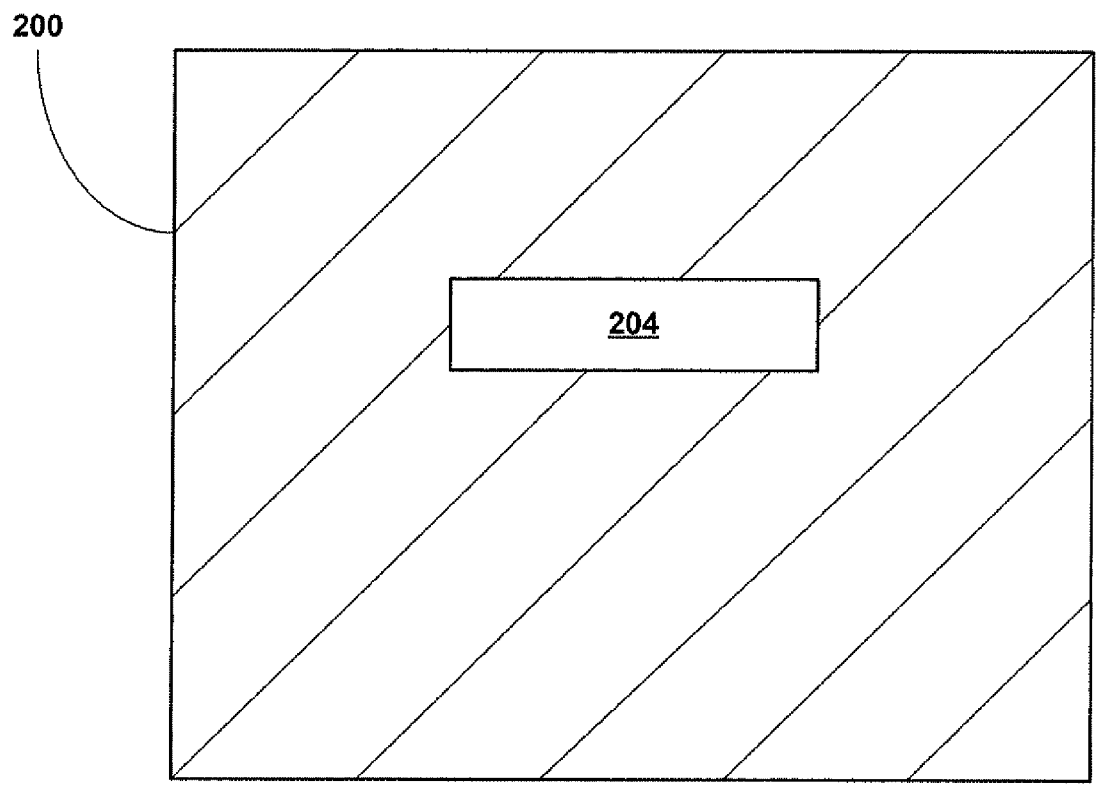
FIG. 2f is a cross sectional illustration of the workpiece of FIG. 2e after the completion of machining of the workpiece using the EDM electrode.

As illustrated in FIGS. 2e and 2f, the electrode 100 may then be removed from the workpiece 200. As a result of the operation of the electrode 100, under the control of the EDM motion control system 112, a cavity 204 is formed in the workpiece 200.

Figure 3A:
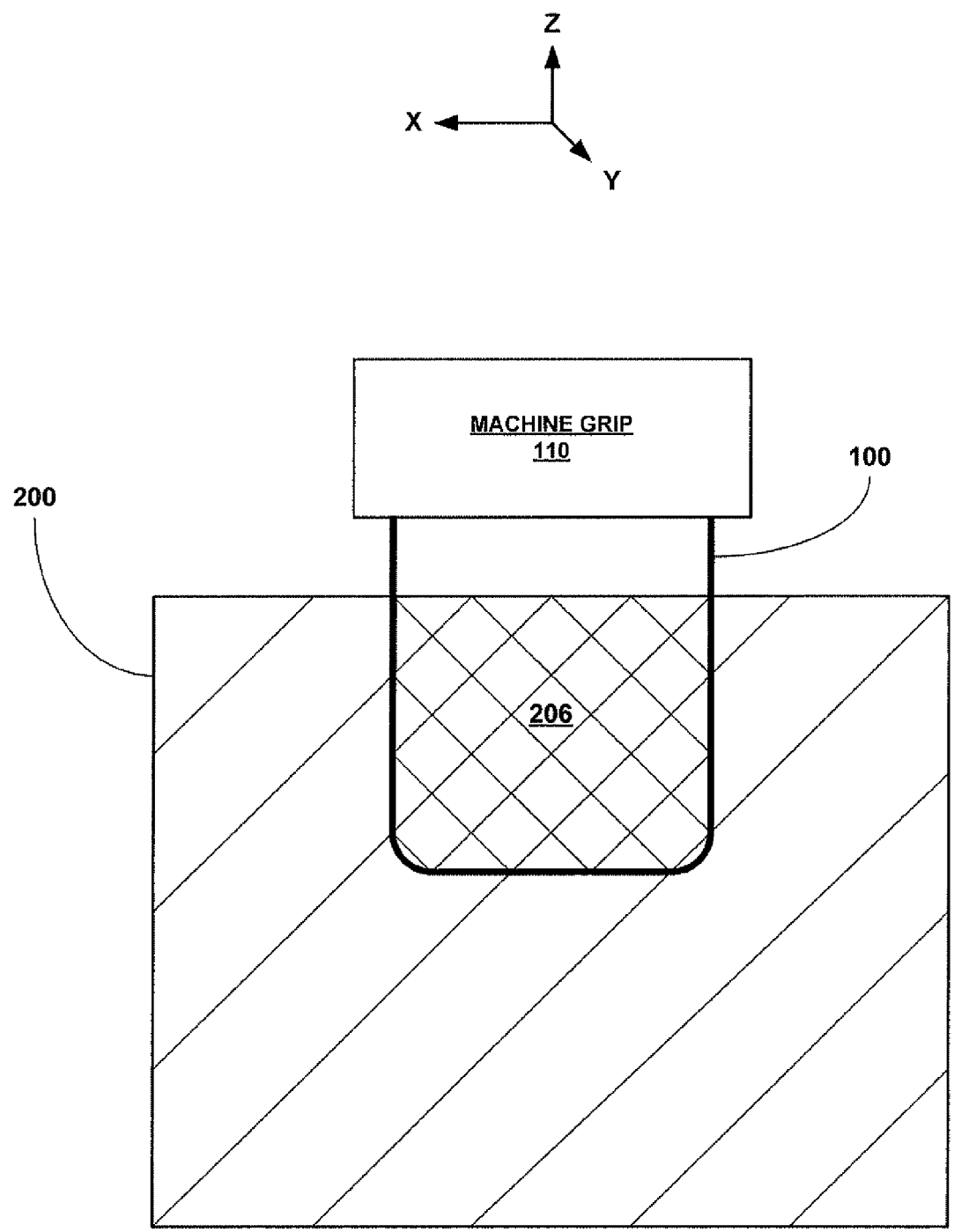
FIG. 3a is a cross sectional illustration of the machining of a workpiece using the EDM electrode of FIG. 1.

Referring now to FIGS. 3a-3d, the operation of the electrode 100, under the control of the EDM motion control system 112, may be modified by displacing the electrode in the Y and Z directions relative to the workpiece 200 using the machine grip 110. As a result, as illustrated in FIG. 3a, the electrode 100 will machine material from the workpiece 200 in a region 206. In an exemplary embodiment, at least a portion of the material removed from the workpiece 200 is removed intact. In this manner, the material used in the workpiece may be recycled.

Figure 3B:
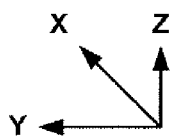
FIG. 3b is a cross sectional illustration of the workpiece of FIG. 3a after the completion of machining of the workpiece using the EDM electrode.
Figure 3B:
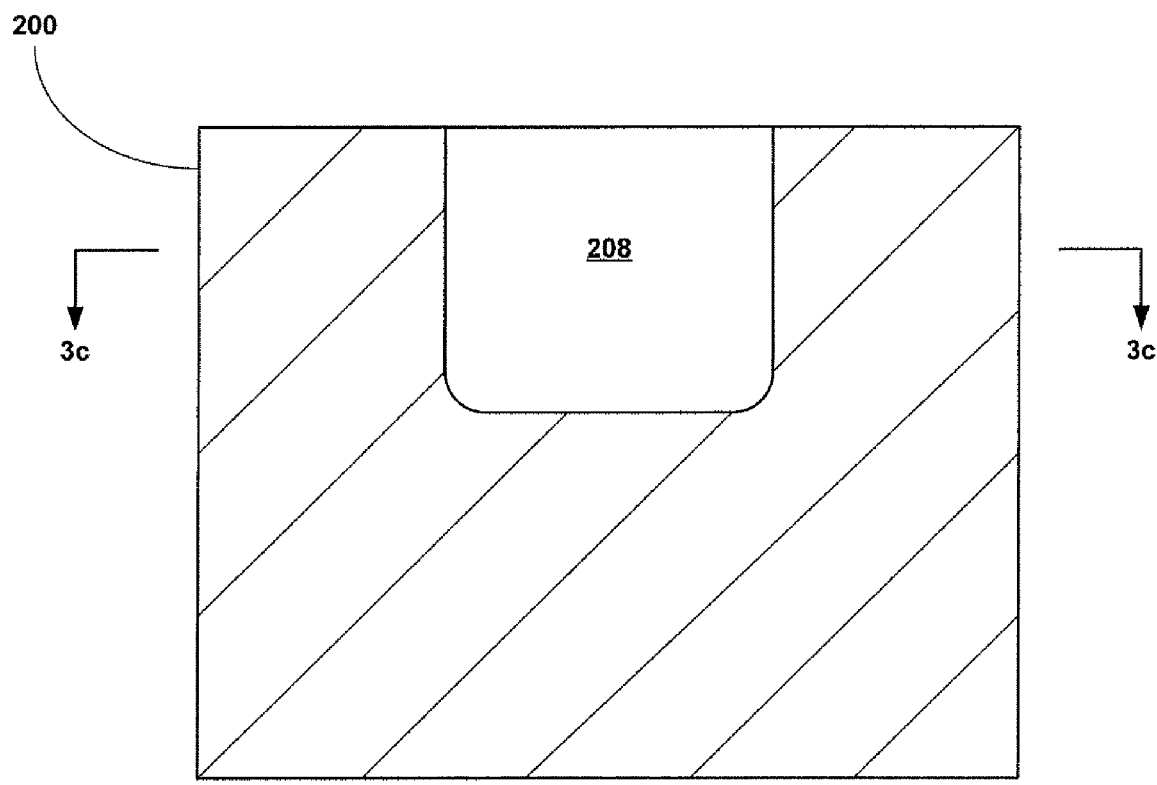
Figure 3C:
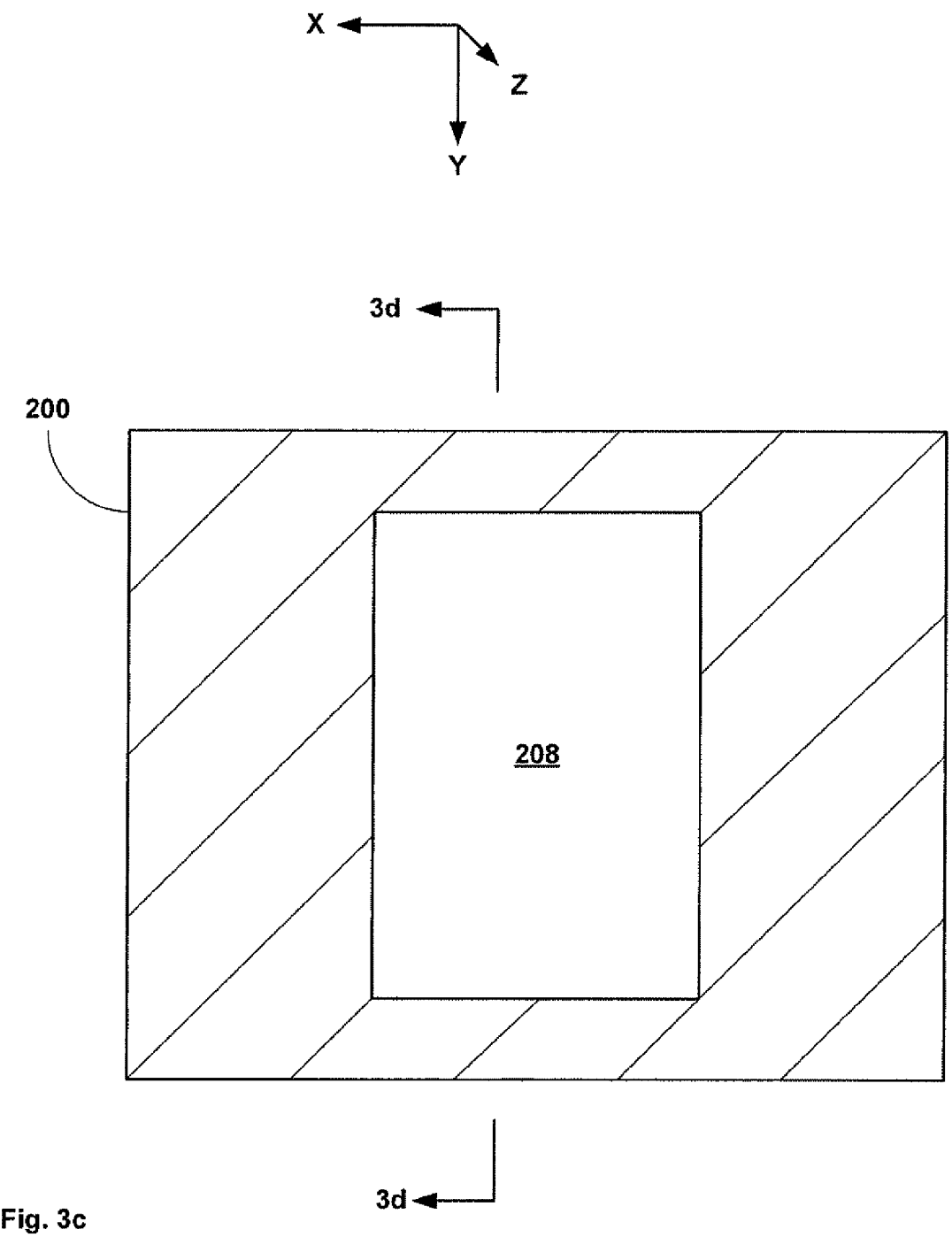
FIG. 3c is a cross sectional illustration of the workpiece of FIG. 3b after the completion of machining of the workpiece using the EDM electrode.
Figure 3D:
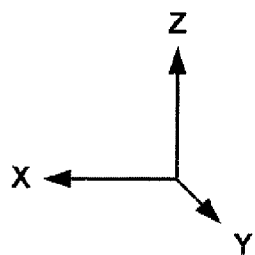
FIG. 3d is a cross sectional illustration of the workpiece of FIG. 3b after the completion of machining of the workpiece using the EDM electrode.
Figure 3D:
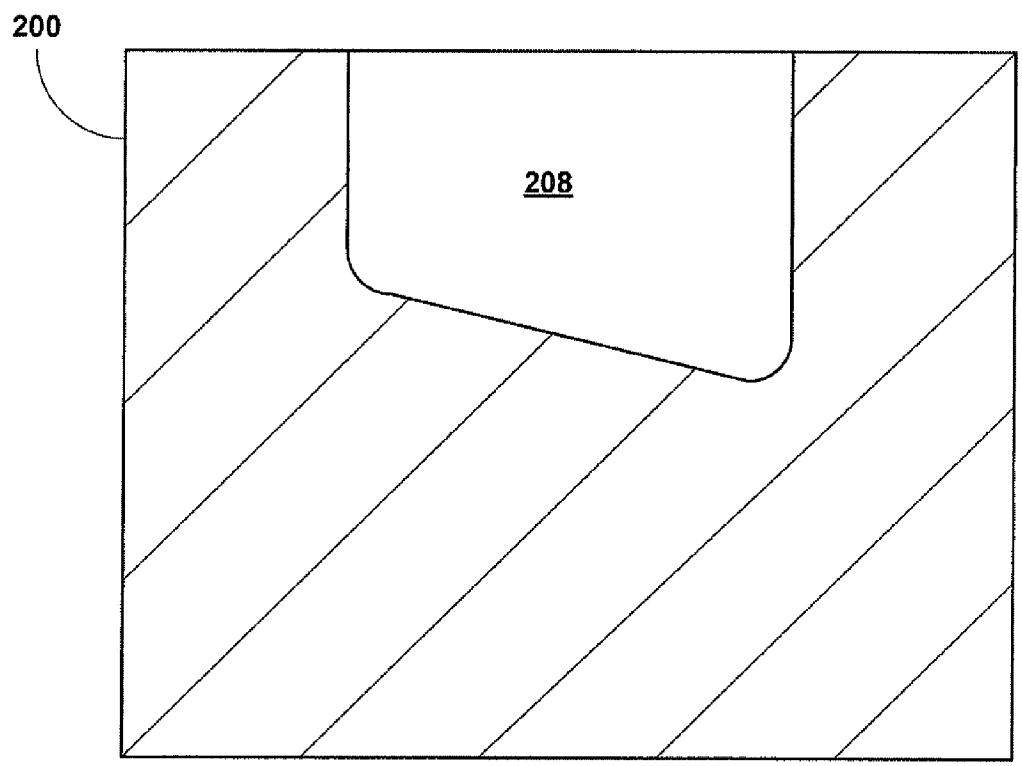

As illustrated in FIGS. 3b-3d, the electrode 100 may then be removed from the workpiece 200. As a result of the operation of the electrode 100, under the control of the EDM motion control system 112, an elongated compound cavity 208 is formed in the workpiece 200.

Figure 4A:
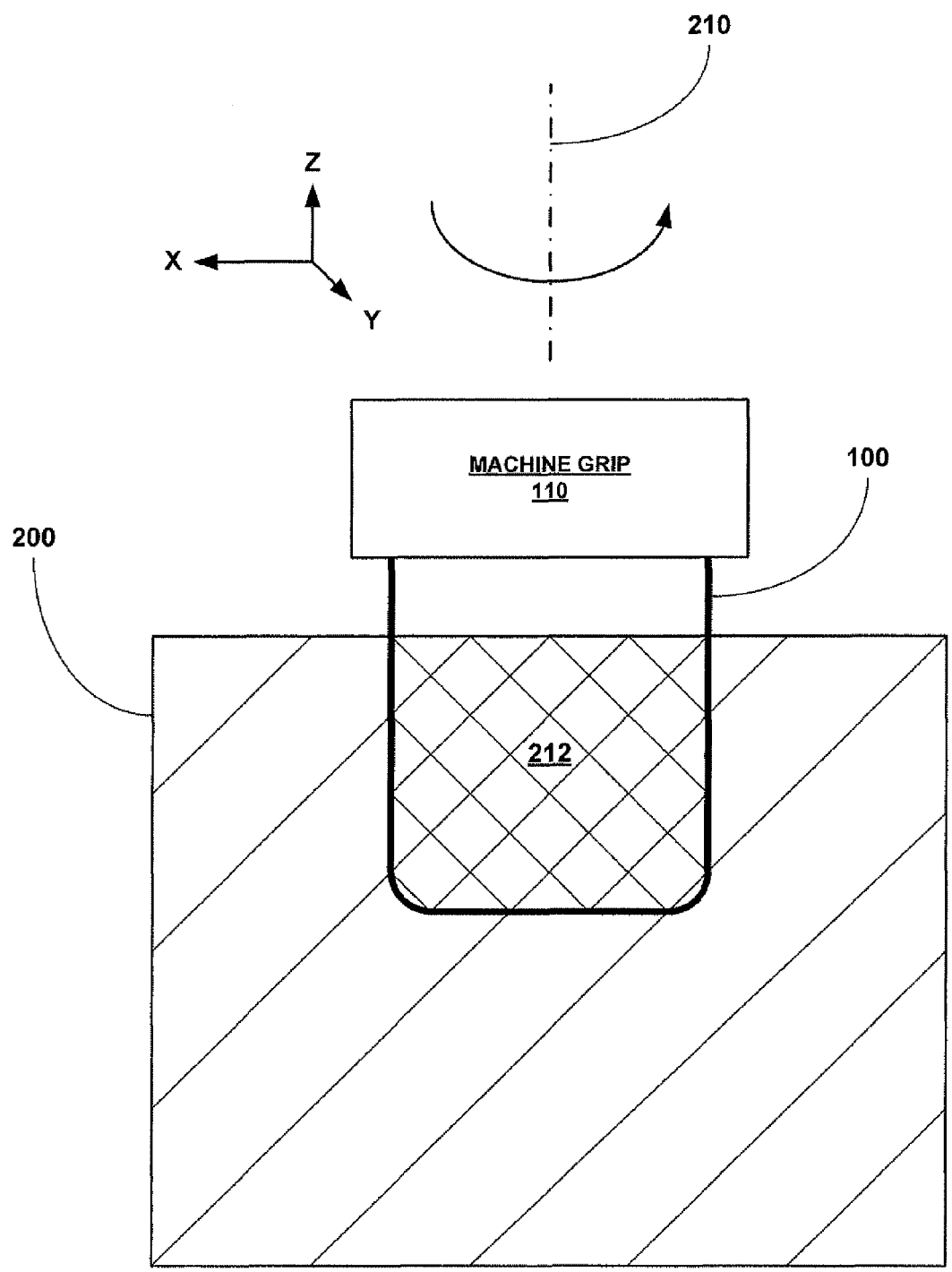
FIG. 4a is a cross sectional illustration of the machining of a workpiece using the EDM electrode of FIG. 1.
Figure 4B:
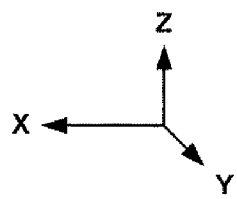
FIG. 4b is a cross sectional illustration of the workpiece of FIG. 4a after the completion of machining of the workpiece using the EDM electrode.
Figure 4B:
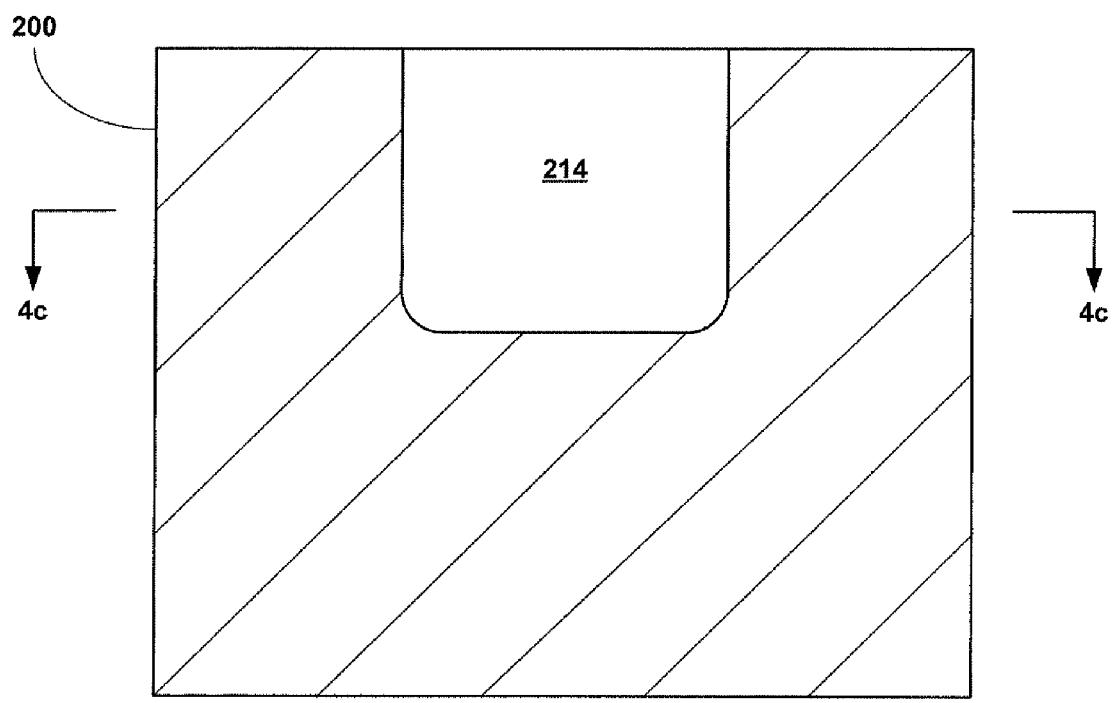
Figure 4C:
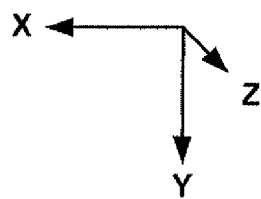
FIG. 4c is a cross sectional illustration of the workpiece of FIG. 4b after the completion of machining of the workpiece using the EDM electrode.
Figure 4C:
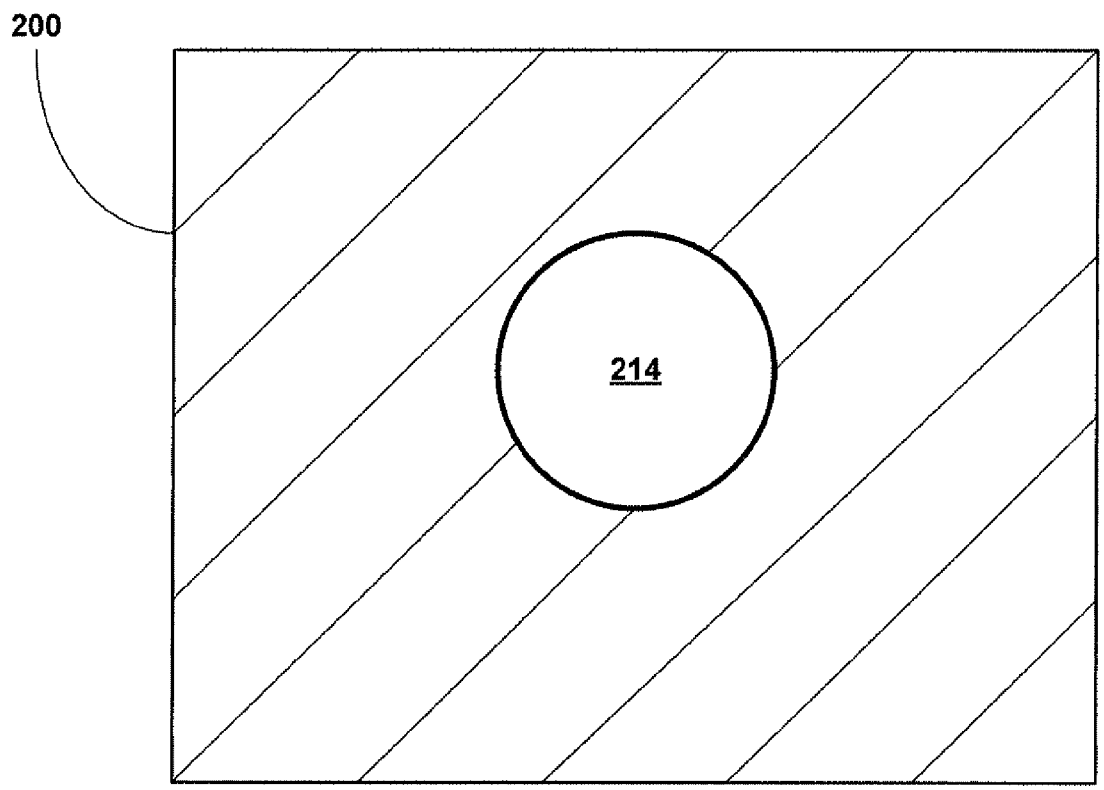

Referring now to FIGS. 4a-4c, the operation of the electrode 100, under the control of the EDM motion control system 112, may be modified by displacing the electrode in the Y direction relative to the workpiece 200 and then rotating the electrode about an axis 210 using the machine grip 110. As a result, as illustrated in FIG. 4a, the electrode 100 will machine material from the workpiece 200 in a region 212.

As illustrated in FIGS. 4b and 4c, the electrode 100 may then be removed from the workpiece 200. As a result of the operation of the electrode 100, under the control of the EDM motion control system 112, a cylindrical cavity 214 is formed in the workpiece 200.

In several exemplary embodiments, the electrode 100 may be displaced relative to the workpiece 200 by translating the electrode in or more direction and rotating the electrode about one or more axis to machine complex shaped cavities in the workpiece.

Figure 5A:
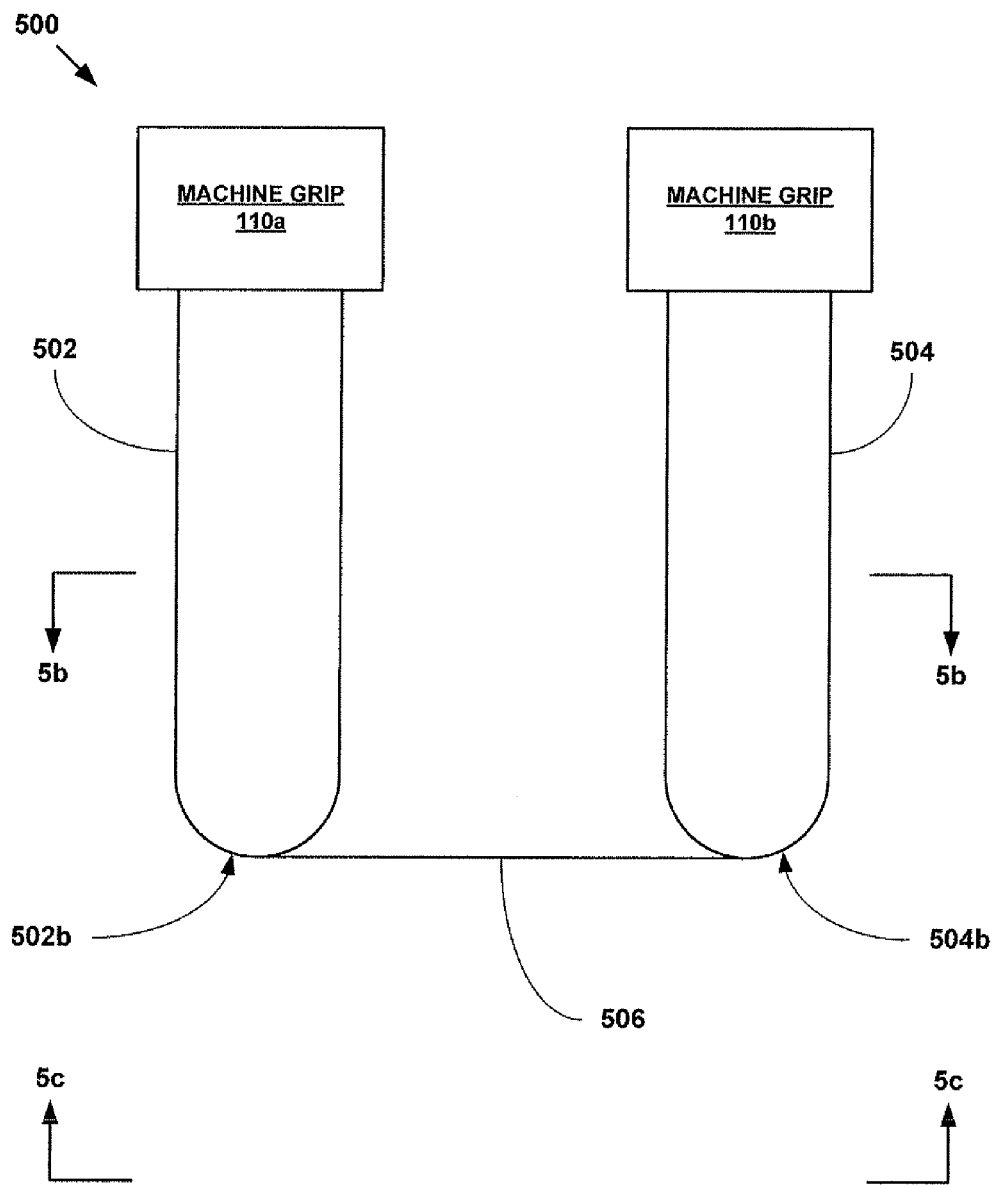
FIG. 5a is an illustration of an EDM electrode with wire feed.
Figure 5B:
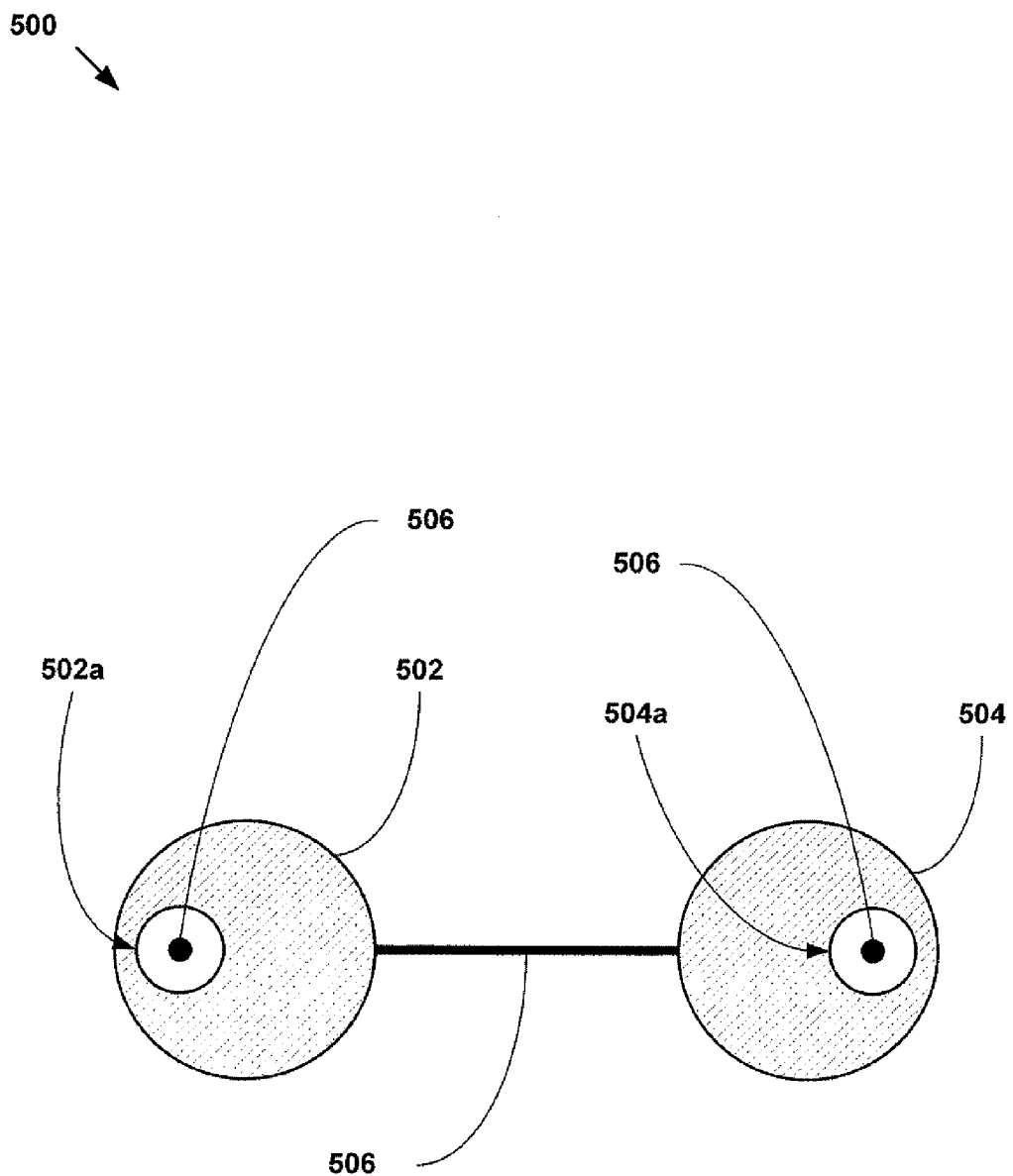
Figure 5C:
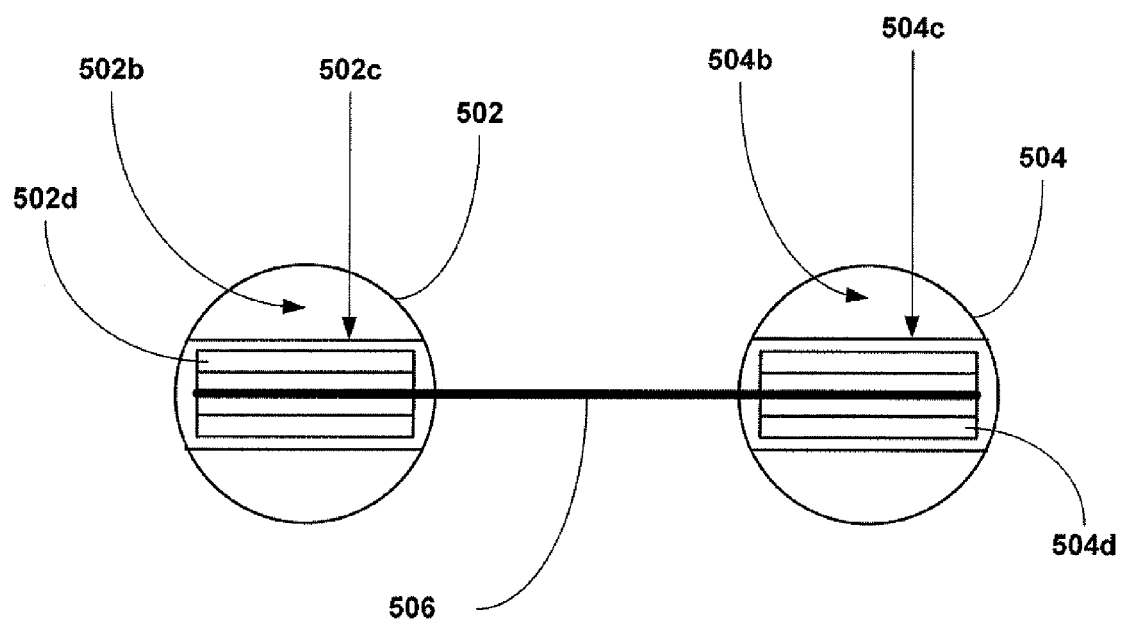

Referring to FIGS. 5a-5c, an exemplary embodiment of an electrode 500 for EDM machining will now be described that includes a pair of spaced apart vertical electrodes, 502 and 504, that define internal passages, 502a and 504a, respectively. In an exemplary embodiment, the ends of the each of the vertical electrodes, 502 and 504, radiused outer surfaces, 502b and 504b, and recessed portions, 502c and 504c, that house pulleys, 502d and 504d. A conventional EDM wire 506 passes through the passages, 502a and 504a, of the vertical electrodes, 502 and 504, and extends in a horizontal direction between the radiused outer surfaces, 502b and 504b, and pulleys, 502d and 504d, of the vertical electrodes. In an exemplary embodiment, the EDM wire 506 remains in tension between the tips of the vertical electrodes, 502 and 504, during the machining operation.

The other ends of the vertical electrodes, 502 and 504, of the electrode 500 are connected to conventional machine grips, 110a and 11b, and a conventional EDM motion control system 112. The general operation of EDM electrodes and wires to machine material from a workpiece is considered well known to persons having ordinary skill in the art.

In several exemplary embodiments, each of the vertical electrodes, 502 and 504, may be manipulated by a single grip 110, or independently by a plurality of grips in order to create complex and/or compound contours. In an exemplary embodiment, the manipulation of the vertical electrodes, 502 and 504, by a plurality of separate machine grips permits the creation of complex, multi-dimensional, cavities in a workpiece. For example, each of the vertical electrodes, 502 and 504, may be manipulated by separate multi-axis motion control systems such that the inclination, depth, and X-Y location of the vertical electrodes may be simultaneously separately controlled.

In an exemplary embodiment, the electrode 500, under the control of the EDM motion control system 112, may be operated as described above, with reference to FIGS. 2a-4c, in order to machine one or more cavities in the workpiece 200.

In an exemplary embodiment, prior to operation of the electrode 500, a conventional EDM electrode or the EDM electrode 100 may be used to machine an initial cavity that defines the greatest depth of the ultimate cavity to be formed.

In an exemplary embodiment, a conventional EDM electrode or the EDM electrode 100 may be used to machine a path within the workpiece for the vertical electrodes, 502 and 504, to move through such that the EDM wire 506 is used primarily for the final machining operation on the workpiece.

In an exemplary embodiment, the electrode 500 may be used in combination with the electrode 100.

It is understood that variations may be made in the above without departing from the scope of the invention. For example, the use of the EDM electrodes, 100 and 500, of the present exemplary embodiments permit the machining of complex multi-dimensional cavities in workpieces. Further, spatial references are for the purpose of illustration only and do not limit the specific orientation or location of the structure described above. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. An electrode for electrical discharge machining, comprising:
   a pair of rigid electrodes that each define a separate passageway therethrough, each passageway positioned substantially radially offset from a center of the respective rigid electrode and extending along adjacent outer surface portions of the respective rigid electrodes; and
   a wire electrode extending through the passageways of the rigid electrodes and extending between ends of the rigid electrodes.

2. The electrode of claim 1, wherein the ends of the rigid electrodes include radiused outer surfaces.

3. A method of electrical discharge machining a workpiece, comprising:
   providing an electrode comprising a rigid electrode formed in the shape of a loop;
   injecting electrical energy into the electrode; and
   displacing the loop-shaped electrode within the workpiece, to include:
      extending the loop-shaped electrode longitudinally through a surface of the workpiece being substantially perpendicular to the loop-shaped electrode to extend the electrode within the workpiece defining an entry location to thereby remove material from the workpiece, and
      rotating the loop-shaped electrode about a central axis of the loop-shaped electrode, forming a cavity in the workpiece.

4. The method of claim 3, wherein the shape of the loop approximates a U-shape.

5. The method of claim 3, wherein displacing the electrode within the workpiece further comprises:
   translating the loop-shaped electrode relative to the workpiece.

6. The method of claim 3, wherein displacing the electrode within the workpiece further comprises:
   translating the loop-shaped electrode relative to the workpiece prior to rotating the loop shaped electrode.

7. The method of claim 3, wherein step of rotating the loop-shaped electrode is performed prior to translating the loop-shaped electrode relative to the workpiece.

8. A method of electrical discharge machining a workpiece, comprising:
   providing an electrode in the shape of a loop, the loop shaped electrode comprising:
      a pair of rigid electrodes that each define a separate passageway therethrough, each rigid electrode separately utilized to form a respective pathway through the workpiece when rotating or translating the respective rigid electrode through a body portion of the workpiece, and
      a wire electrode extending through the passageways, of the rigid electrodes and extending between ends of the rigid electrodes;
   injecting electrical energy into the electrode; and
   displacing the loop-shaped electrode within the workpiece, to include:
      extending the loop-shaped electrode longitudinally through a surface of the workpiece being substantially perpendicular to the loop-shaped electrode to extend the electrode within the workpiece defining an entry location to thereby remove material from the workpiece, and
      performing one or more of the following:
         rotating the loop-shaped electrode about a central axis of the loop-shaped electrode, forming a cavity in the workpiece;
         translating the loop-shaped electrode substantially laterally from the entry location nad retracting the loop-shaped electrode prior to reaching a lateral surface of the workpiece, forming a cavity in the workpiece.

9. The method of claim 8, wherein the respective passageway of each rigid electrode is positioned substantially radially offset from a center of the respective rigid electrode and extends along adjacent outer surface portions of the respective rigid electrodes, and wherein the ends of the rigid electrodes include radiused outer surfaces.

10. The method of claim 8, wherein displacing the electrode within the workpiece comprises:
    translating the loop-shaped electrode relative to the workpiece.

11. The method of claim 8, wherein displacing the electrode within the workpiece comprises:
    rotating the loop-shaped electrode relative to the workpiece.

12. The method of claim 8, wherein displacing the electrode within the workpiece comprises:
    translating and rotating the loop-shaped electrode relative to the workpiece.

13. The method of claim 8, wherein displacing the electrode within the workpiece comprises:
    translating and then rotating the loop-shaped electrode relative to the workpiece.

14. The method of claim 8, wherein displacing the electrode within the workpiece comprises:
    rotating and then translating the loop-shaped electrode relative to the workpiece.

15. The method of claim 8, wherein the step of displacing the loop-shaped electrode within the workpiece, further includes:
    separately simultaneously controlling inclination, depth, and X-Y location of each of the pair of rigid electrodes to create complex, compound, or complex and compound contours.

16. An electrical discharge machining system, comprising:
    a pair of rigid electrodes that each define a passageway therethrough, each of the rigid electrodes adapted to form a respective pathway through a body portion of a workpiece when rotating or translating the respective rigid electrode through the body portion of the workpiece;
    a wire electrode extending through the passageways of the rigid electrodes and extending between ends of the rigid electrodes; and
    a motion control system operably coupled to the rigid electrodes adapted to move each rigid electrode independently within confines of the body portion of the workpiece.

17. A method of electrical discharge machining a workpiece, comprising:
    providing first and second rigid electrodes;
    providing a wire electrode extending between the first and second rigid electrodes;
    injecting electrical energy into the first and the second rigid electrodes and the wire electrode; and
    independently displacing the first and second rigid electrodes within confines of the workpiece to form a cavity within the confines of the workpiece having complex, compound, or complex and compound contours and to remove material from the workpiece.

* * * * *